(12) United States Patent
Evans et al.

(10) Patent No.: US 7,233,090 B2
(45) Date of Patent: Jun. 19, 2007

(54) ELECTRIC MACHINE, IN PARTICULAR BRUSHLESS SYNCHRONOUS MOTOR

(75) Inventors: Steven-Andrew Evans, Buehl (DE); Susanne Evans, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/499,093

(22) PCT Filed: May 26, 2003

(86) PCT No.: PCT/DE03/01714

§ 371 (c)(1),
(2), (4) Date: Jun. 16, 2004

(87) PCT Pub. No.: WO2004/051824

PCT Pub. Date: Jun. 17, 2004

(65) Prior Publication Data

US 2005/0035677 A1    Feb. 17, 2005

(30) Foreign Application Priority Data

Dec. 4, 2002    (DE) ............................. 102 56 523

(51) Int. Cl.
*H02K 21/12* (2006.01)
(52) U.S. Cl. .................... 310/156.57; 310/156.49
(58) Field of Classification Search ........... 310/156.53, 310/156.46, 156.57, 269, 261, 43, 156.49
See application file for complete search history.

(56) References Cited

U.S. PATENT DOCUMENTS

| | | | |
|---|---|---|---|
| 3,678,913 A * | 7/1972 | Zimmermann et al. | 123/149 D |
| 4,459,500 A * | 7/1984 | Miyamoto | 310/154.21 |
| 4,658,165 A * | 4/1987 | Vanderschaeghe | 310/156.57 |
| 5,191,256 A * | 3/1993 | Reiter et al. | 310/156.49 |
| 5,359,248 A * | 10/1994 | Nagate et al. | 310/156.49 |
| 5,369,325 A * | 11/1994 | Nagate et al. | 310/156.54 |
| 5,371,426 A * | 12/1994 | Nagate et al. | 310/261 |
| 5,672,926 A * | 9/1997 | Brandes et al. | 310/156.53 |
| 5,731,647 A * | 3/1998 | Schuller et al. | 310/156.53 |
| 6,008,559 A * | 12/1999 | Asano et al. | 310/156.53 |

(Continued)

FOREIGN PATENT DOCUMENTS

DE    198 51 883 A    5/2000

(Continued)

OTHER PUBLICATIONS

Patent Abstract sof Japan vol. 18, No. 540 (E-1616) Oct. 14, 1994 & JP 06 189481 A, Jul. 8, 1994.

(Continued)

*Primary Examiner*—Dang Le
(74) *Attorney, Agent, or Firm*—Michael J. Striker

(57) ABSTRACT

An electrical machine, in particular a brushless synchronous motor has a stator (14) and a rotor (12) with salient poles (18) disposed distributed over its circumference, each of which poles has an enclosed permanent magnet (11) and a pole shoe (19) that extends radially outward from the permanent magnet and defines an air gap (13) between the stator (14) and rotor (12). In order to achieve a low cogging torque and a low torque undulation, the pole shoes (19) are embodied as magnetically anisotropic, with a preferred direction of the greater magnetic conductivity extending parallel to the radial salient pole axis.

4 Claims, 5 Drawing Sheets

U.S. PATENT DOCUMENTS 6,208,054 B1 * 3/2001 Tajima et al. ............... 310/216
6,329,734 B1 * 12/2001 Takahashi et al. ..... 310/156.56
6,717,314 B2 * 4/2004 Horst et al. ............ 310/156.43

FOREIGN PATENT DOCUMENTS

| EP | 0 538 472 A | 4/1993 |
| EP | 0 926 801 A | 6/1999 |
| EP | 1 028 047 A2 | 8/2000 |
| JP | 09131009 A * | 5/1997 |

OTHER PUBLICATIONS

Patent Abstracts of Japan vol. 1997, No. 09, Sep. 30, 1997 & JP 09 131009 A, May 16, 1997.

* cited by examiner

ELECTRIC MACHINE, IN PARTICULAR BRUSHLESS SYNCHRONOUS MOTOR

BACKGROUND OF THE INVENTION

The invention is based on an electrical machine, in particular a brushless synchronous motor.

In conventional, permanent magnet-excited, brushless synchronous motors that are designed as internal rotor motors, the permanent magnets that generate the excitation field in the working air gap between the rotor and stator are embodied in the form of shell segments affixed to the surface of the rotor. If it is optimized, a synchronous motor of this kind has a low cogging torque and a low degree of torque undulation, which is very favorable for certain uses of the motor in which a very smooth torque is required. The disadvantage of this motor is the high production cost, due in particular to the production of the shell-shaped permanent magnets, which must be ground in order to produce the shell shape.

In order to reduce the production costs, brushless synchronous motors have therefore been developed in which the permanent magnets embedded in the rotor are "buried" in it (EP 1 028 047 A2). The "buried" permanent magnets are mostly rectangular and can be easily cut from a large block of permanent magnet material, which reduces costs in comparison to a shell-segment magnet. Even when optimized, such a brushless synchronous motor with "internally buried" permanent magnets, also referred to as an IPM motor, tends to have a significantly higher cogging torque and higher degree of torque undulation than a comparable motor with shell-shaped permanent magnet segments on the surface of the rotor.

SUMMARY OF THE INVENTION

The electrical machine according to the invention, in particular the brushless synchronous motor according to the invention with the features of claim 1, has the advantage over the known IPM motor of a significantly reduced cogging torque and a significantly lower degree of torque undulation. The manufacturing costs are on a par with those of the known IPM motor and are significantly lower than those of the known brushless synchronous motor with shell-shaped permanent magnet segments on the surface of the rotor.

As opposed to the known IPM motors that have an approximately trapezoidal voltage curve, the magnetic anisotropy of the pole shoes according to the invention, i.e. of the regions of the rotor disposed in front of the "buried" permanent magnets in the direction toward the working air gap, results in a sinusoidal curve of the induced voltage or EMF, so that the harmonic distortion of the EMF is lower, thus reducing the torque undulation when sinusoidal supply current is used. The peak value of the EMF increases and therefore so does the average torque produced by the motor, when no prior commutation is used. In addition, the magnetic anisotropy of the pole shoes reduces the iron losses in the pole shoes and also reduces the transverse field of the armature. For powerful winding currents, the "salience" (i.e. the ratio of shunt inductance $L_q$ to series inductance $L_d$), which should ideally be 1, is reduced in comparison to that in the known IPM motors, which likewise reduces torque undulation.

According to a preferred embodiment of the invention, the permanent magnets are embodied in a rectangular form and have a magnetization direction extending parallel to the normals of the larger magnet surfaces. The preferred direction of the greater magnetic conductivity or relative permeability of the pole shoes is aligned so that it points in the magnetization direction of the permanent magnets.

According to an advantageous embodiment of the invention, in order to achieve the magnetic anisotropy, a multitude of flux barriers spaced apart from one another are incorporated into the pole shoes, extending parallel to the radial salient pole axis. Preferably the flux barriers are comprised of cutouts in the pole shoes, but can alternatively also be embodied in the form of inclusions made of magnetically nonconductive material. The embodiment of the flux barriers in the form of cutouts has the advantage of reducing the mass of the pole shoes, for example a reduction of approx. 34% for a six-pole or four-pole embodiment of the rotor. The reduced mass results in a reduction in the moment of inertia, which in turn improves the dynamic properties of the electrical machine. The reduced centrifugal force permits a higher speed to be achieved with the same radial strut width.

According to an alternative embodiment of the invention, in order to achieve the magnetic anisotropy, the pole shoes are made of 2D-anisotropic SMC (soft magnetic composite)-powdered iron material. The magnetic property of this material is approximately four to five times greater in the preferred direction than perpendicular to the preferred direction; for example the relative permeability in the preferred direction is approximately 800 and the relative permeability perpendicular to the preferred direction is approximately 200.

BRIEF DESCRIPTION OF THE DRAWINGS

The invention will be explained in detail in the description below, in conjunction with exemplary embodiments shown in the drawings.

DETAILED DESCRIPTION OF THE PREFERRED EMBODIMENTS

Figure 1:
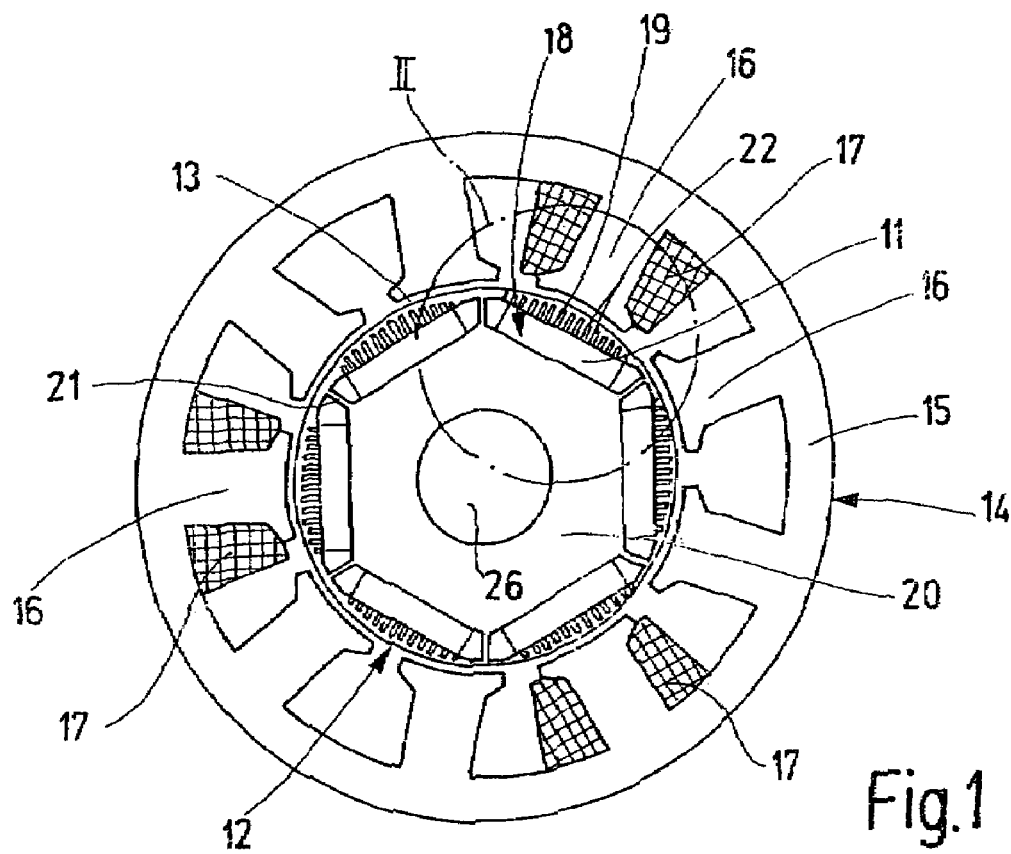
FIG. 1 shows a schematic cross section through a six-pole brushless synchronous motor.

The brushless synchronous motor, a cross section of which is schematically depicted in FIG. 1 as an exemplary embodiment of a generic electrical machine, is embodied as an internal rotor motor and has a rotor 12 equipped with permanent magnets 11 and a stator 14 that concentrically encompasses the rotor 12 to form a working air gap 13. The stator 14 is comprised of a yoke ring 15 and a multitude of stator teeth 16, which protrude radially inward from the yoke ring 15 and are disposed equidistantly from one another in the circumference direction. Each stator tooth 16 has an annular coil 17 wound onto it; FIG. 1 depicts the annular coils 17 of only one phase or winding of the stator winding. In the exemplary embodiment in FIG. 1, the stator winding is embodied as a three-phase or three-winding stator, with three annular coils 17 connected in series or in parallel. There are therefore nine stator teeth 16.

The rotor of the for example six-pole synchronous motor has six salient poles 18, each with an enclosed permanent magnet 11 and a radially adjoining pole shoe 19 extending outward from it toward the air gap 13. The rotor 12 has a polygonal, prismatic rotor core 20, which in the exemplary embodiment of the six-pole synchronous motor, is a hexagonal prism. A central, cylindrical opening 26 allows the rotor core 20 to be slid onto a rotor shaft. Each prism side of the hexagonal rotor core 20 is adjoined by the large magnetic surface 111 of a flat, block-shaped permanent magnet 11 (FIG. 2) so that the normal on the magnet surface is aligned in the radial direction. The identically sized magnet surface 112 oriented away from this magnet surface 111 is covered by a respective pole shoe 19. The pole shoes 19 of all of the salient poles 18 abut one another in the circumference direction, are of one piece with one another, and are also of one piece with the rotor core 20, fastened to it by means of narrow radial struts 21; the radial struts 21 protrude outward from the vertices of the hexagonal prism. The rotor core 20 with the pole shoes 19 and radial struts 21 is comprised of a multitude of one-piece profiled sheet metal plates stacked against one another. The permanent magnets 11 contained inside the salient poles 18 are magnetized so that their magnetization direction extends parallel to the normals on the large magnet surfaces 111, 112; viewed in the circumference direction, the magnetization direction in succeeding permanent magnets 11 is rotated by 180° so that the magnetization directions in neighboring salient poles 18 are inverse to each other.

In order to produce a sinusoidal curve of the induced voltage, which along with a sinusoidal winding current, produces a torque curve with a very low degree of torque undulation, the pole shoes 19 disposed on the side the permanent magnets 11 oriented toward the air gap 13 are embodied as magnetically anisotropic; they have a preferred direction of greater magnetic conductivity or permeability that extends parallel to the radial salient pole axis, thus coinciding with the magnetization direction of the permanent magnets 11. This anisotropy of the salient poles 18 forces the magnetic flux in the salient poles 18 to travel in a parallel direction, as can be seen in the course of the flux lines depicted in FIG. 2.

Figure 2:
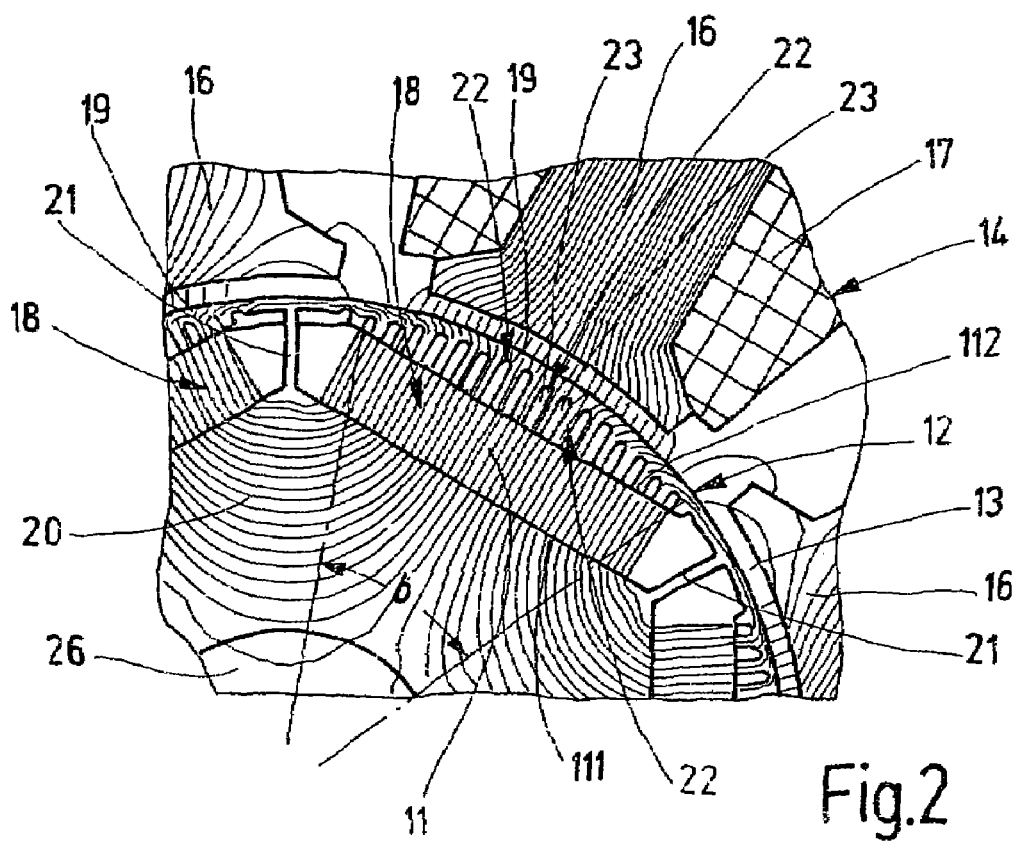
FIG. 2 is an enlarged depiction of the detail II in FIG. 1, with flux paths indicated.

In the exemplary embodiment of the synchronous motor depicted in FIGS. 1 and 2, the magnetic anisotropy is achieved by means of a number of flux barriers 22 that are incorporated into the pole shoes 19 spaced apart from one another so that they extend parallel to the radial salient pole axis. The flux barriers 22 for the magnetic flux are embodied as cutouts 23, which, together with the sheet metal cutting of the sheet metal plates for the rotor 12, are stamped out in comb-like fashion, with the comb openings oriented toward the sheet metal core, which when the permanent magnets 11 are then inserted, rest against their magnet surfaces 112. The number of cutouts 23 per pole shoe 19 depends on the width of the salient poles 18, i.e. the width of the permanent magnets 11 and pole shoes 19 viewed in the circumference direction, and the thickness of the sheet metal plates. Preferably, as large as possible a number of cutouts 23 is provided (approx. ten to twenty in small motors); the number of cutouts 23 on the circumference increases along with the number of poles of the synchronous motor.

As can be seen from the drawings, the flux barriers 22 are arranged one after the other and distributed over the whole width b of each of the permanent magnets 11 and also laterally beyond both peripheral ends of each of the permanent magnets 11 as considered in a direction of the width b of each of the permanent magnets 11.

In a manner that is not shown here, the flux barriers can alternatively also be comprised of inclusions made of magnetically nonconductive material; the inclusions are once again disposed parallel to and spaced apart from one another in the pole shoes 19.

The graphs in FIGS. 3 to 9 depict the advantageous electromagnetic properties of the novel synchronous motor described above in conjunction with FIGS. 1 and 2 in comparison to a known, similarly designed IPM motor without flux barriers. The curves labeled "1" in the graphs depict the synchronous motor with flux barriers according to FIGS. 1 and 2, the curves labeled "2" belong to the known, conventional IPM motor without flux barriers in the pole shoes. The different electromagnetic properties of the synchronous motors according to the graphs in FIGS. 3 to 5 and FIGS. 7 and 8 are each depicted as a function of the magnet width b as defined in FIG. 2. The magnet width b is indicated in angular electric degrees. The results depicted relate to motors without inclined rotors or stators.

Figure 3:
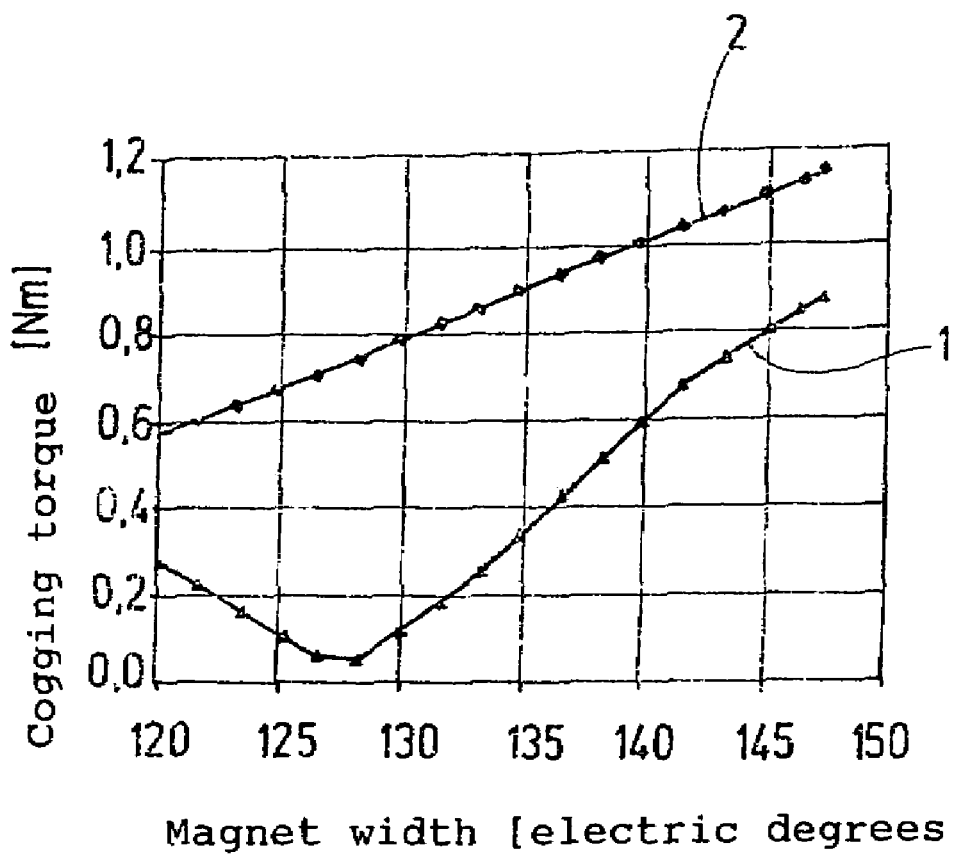
FIGS. 3 to 9 show various graphs of the properties of the motor to illustrate the advantages over the known IPM motor, FIG. 10 schematically depicts a cross sectional detail of a brushless synchronous motor according to another exemplary embodiment.

The graph in FIG. 3 shows the cogging torque curve as a function of the magnet width b. The optimal angle of the magnet width b of the synchronous motor with flux barriers is approximately 128 electric degrees, at which a peak-to-peak value of the cogging torque of only 0.05 Nm is achieved, in comparison to an optimal value of 0.57 Nm for the known IPM motor at an optimal magnet width angle of 120 electric degrees. The anisotropic salient poles 18 with the multiple parallel flux barriers 22 thus achieve a 91% reduction in the minimal peak-to-peak value of the cogging torque. It should be noted that this achieved value of 0.05 Nm is also better than the minimal value that is achieved by a comparable motor with shell magnets on the surface of the rotor 12.

Figure 4:
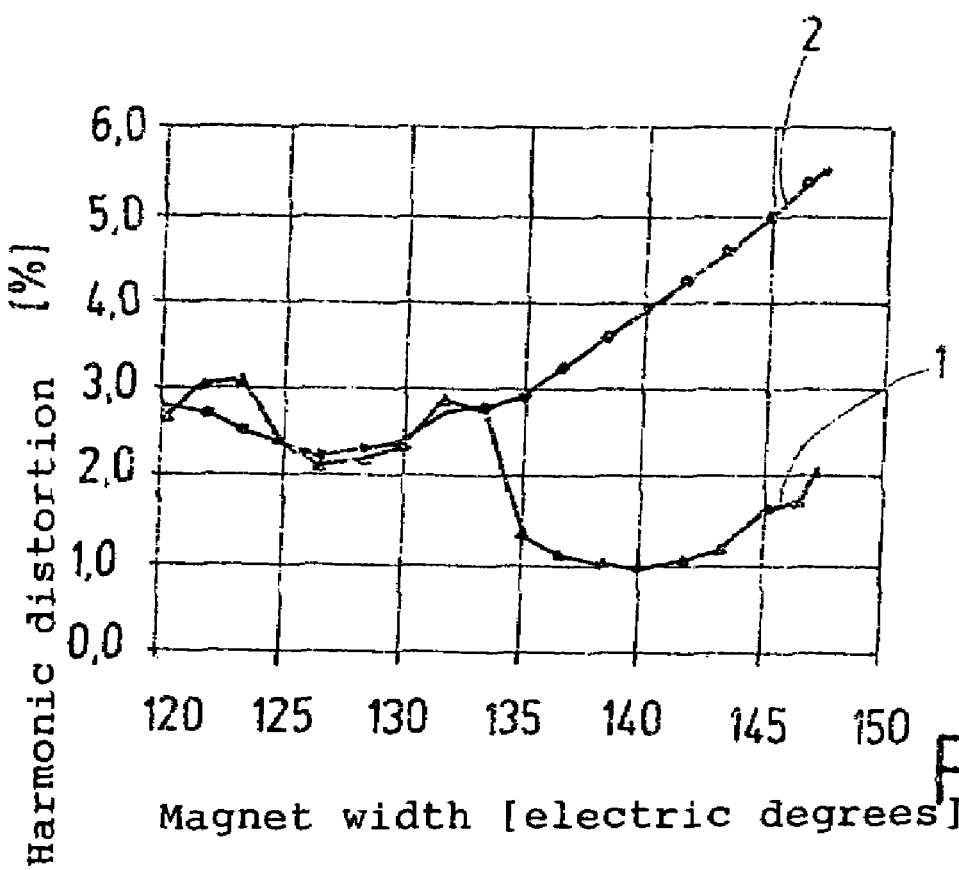

The graph in FIG. 4 depicts the harmonic distortion of the induced voltage curve as a function of the magnet width b. At 140° of magnet width, a harmonic distortion of the voltage curve of 1% is produced, in comparison to the optimal value of 2.2% for the conventional IPM motor without anisotropy at an optimal magnet width angle of 127 electric degrees. This harmonic distortion of 1.0% is identical to the minimal value that is achieved by a comparable motor with shell segments on the surface of the rotor.

Figure 5:
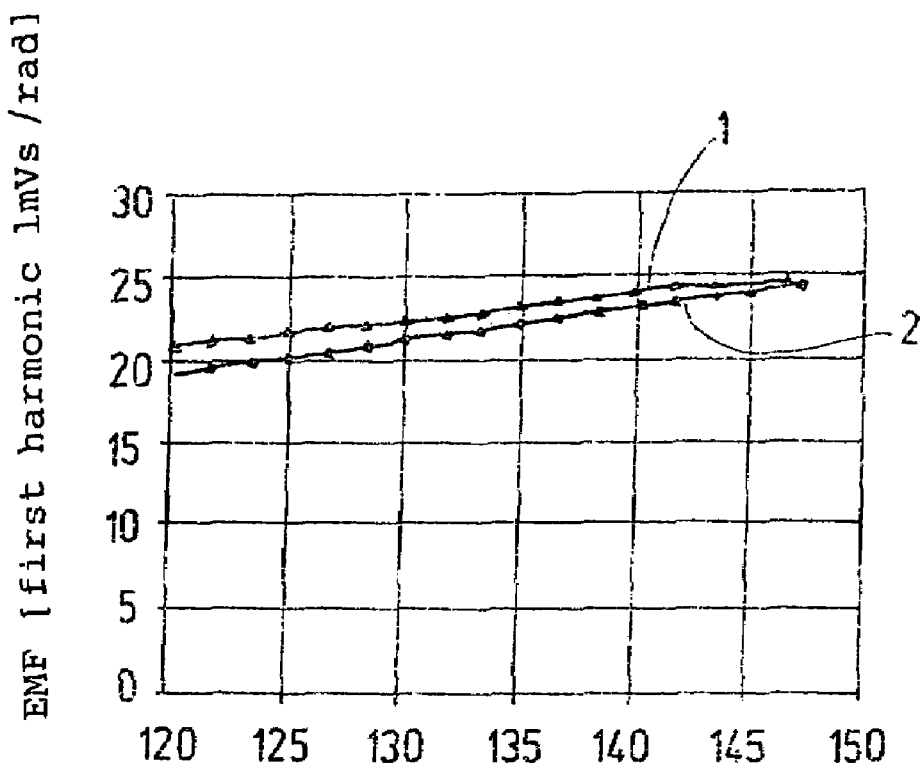

FIG. 5 shows the peak values of the first harmonic of the curve of the induced voltage (electromotive force EMF) over the magnet width b. The peak of the first harmonic value of the synchronous motor with flux barriers is an average of 1.2% higher than in the known IPM motors at all magnet widths. The maximal increase in the peak of the first harmonic is 8.5% higher than in the known IPM motor at a magnet width of 120 electric degrees.

Figure 6:
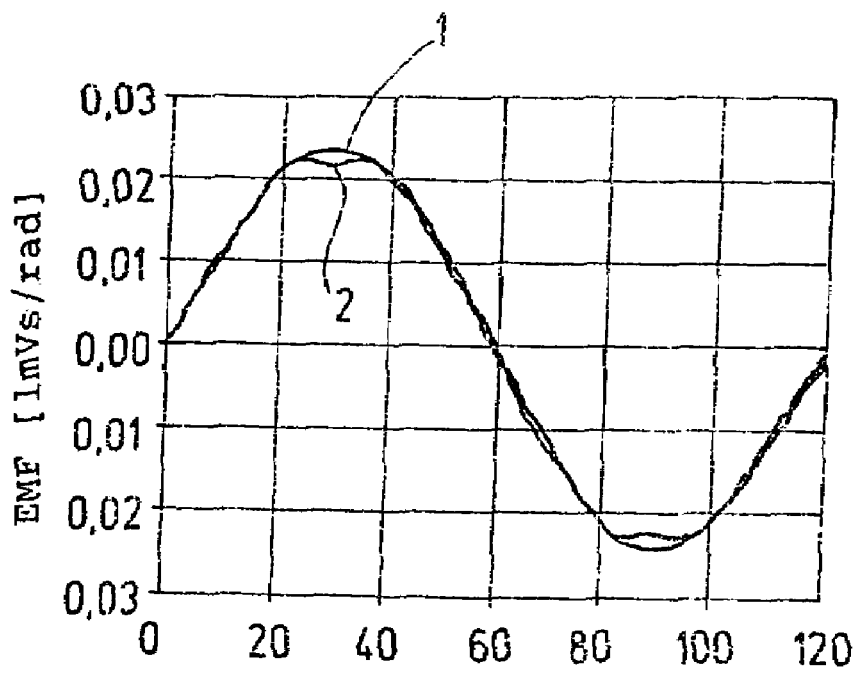

FIG. 6 shows the curve of the induced voltage (EMF) of one winding of the synchronous motor with flux barriers in comparison to the known IPM motor without flux barriers, for an equal magnet width of 140 electric degrees. When the harmonic distortion of only 1.0% produced by the synchronous motor with flux barriers is compared to 3.9% in the known IPM motor (see FIG. 4), the curve of the EMF is distinctly more sinusoidal than in the known IPM motor, which has a more trapezoidal curve.

Figure 7:
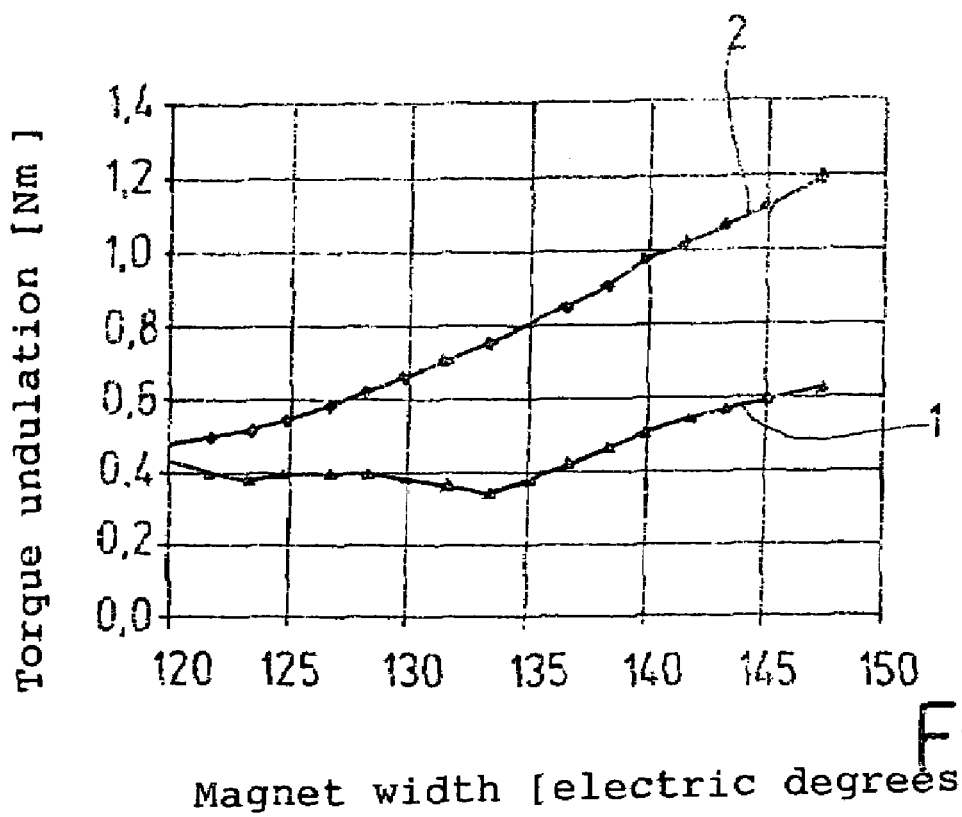

FIG. 7 shows the torque undulation of the two motors to be compared, at different magnet widths b. The optimal value of the synchronous motor with flux barriers is approximately 133 electric degrees; a peak-to-peak value of the torque undulation of only 0.34 Nm is achieved as compared to an optimal value of 0.48 Nm for the known IPM motor at an optimal magnet width angle of 120 electric degrees. In the synchronous motor according to the invention, the use of anisotropic salient pole geometry with multiple parallel flux barriers achieves a 29% reduction in the peak-to-peak value of the torque undulation. It should be noted that this undulation of 0.34 Nm is also better than the minimal value that is achieved in a comparable motor with shell segments on the surface of the rotor 12.

Figure 8:
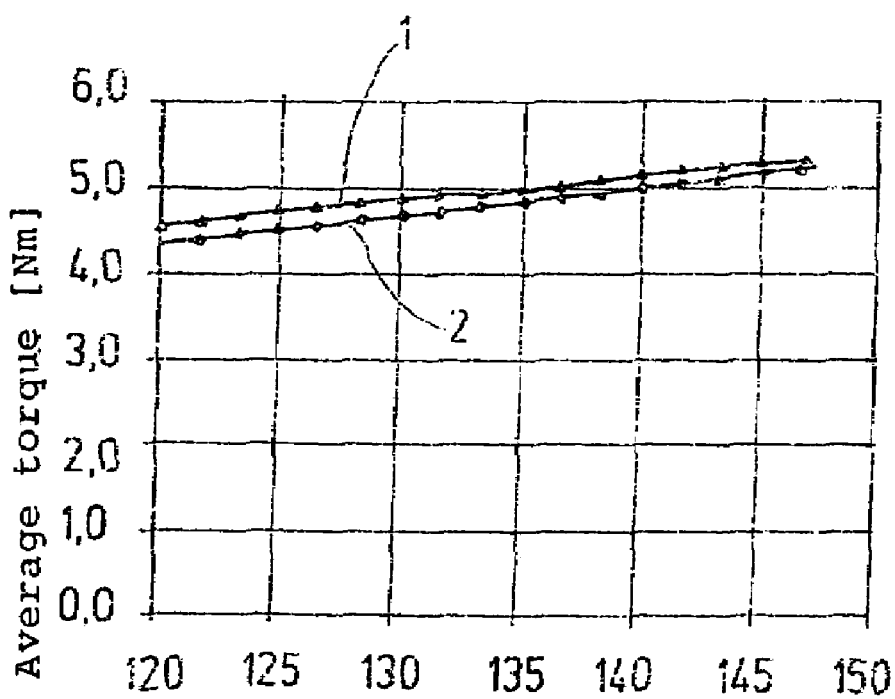
Figure 9:
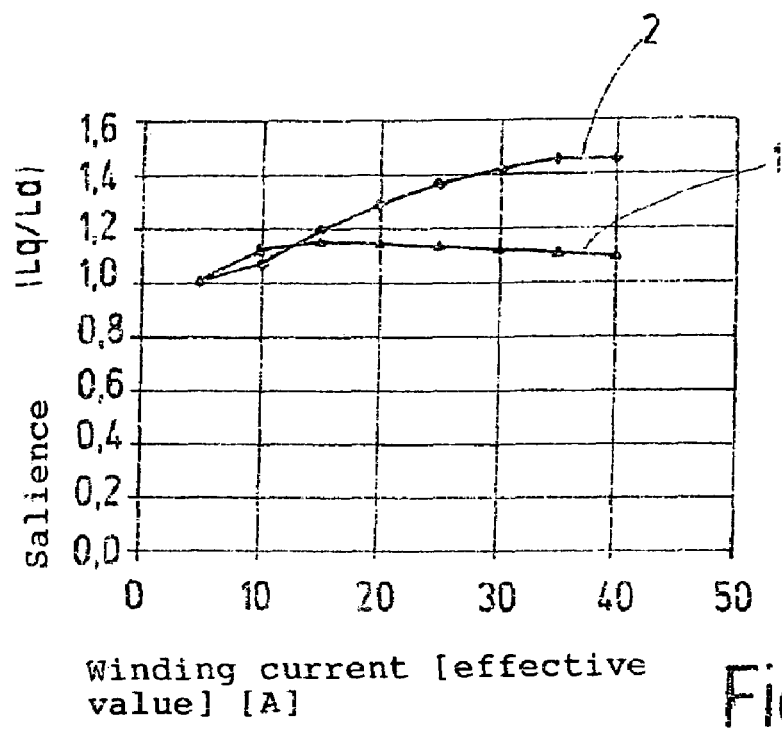

FIG. 8 shows the average torque as a function of the magnet width b. The average torque of the synchronous motor with flux barriers is an average of 3.1% higher than in the known IPM motor at all magnet widths. The maximal increase in the average torque is 4.8%. No prior commutation was used.

Graph 9 depicts the salience $L_q/L_d$ of the two motors as a function of the effective value of the winding current. For a use of the synchronous motor in which a very low torque undulation is required, the motor should have a salience of 1.0% over the entire winding current spectrum. This requirement is fulfilled by motors with shell magnets on the surface of the rotor. If the shunt inductance $L_q$ is greater than the series inductance $L_d$, then this can lead to an increase in the torque undulation.

In the known IPM motor without flux barriers, as the winding current increases, the longitudinal axis flux path becomes saturated, as a result of which the series inductance $L_d$ decreases. The transverse axis flux path, however, is not saturated and therefore the shunt inductance $L_q$ remains virtually constant when there is an increase in the winding current. Because of this behavior, the salience of the known IPM motor increases with the winding current (see curve 2 in FIG. 9). In this example, the maximal salience of the known IPM motor is 1.45 at 40 A of effective winding current. In the synchronous motor with flux barriers according to the invention, with an increase in the winding current, the longitudinal axis and transverse axis flux paths become saturated. The shunt inductance decrease, however, is less than the series inductance decrease. The salience of 1.0 is not in fact achieved, but the salience is sharply reduced in comparison to the known IPM motor and in this example, is only 1.15 at 15 A of effective winding current.

Figure 10:
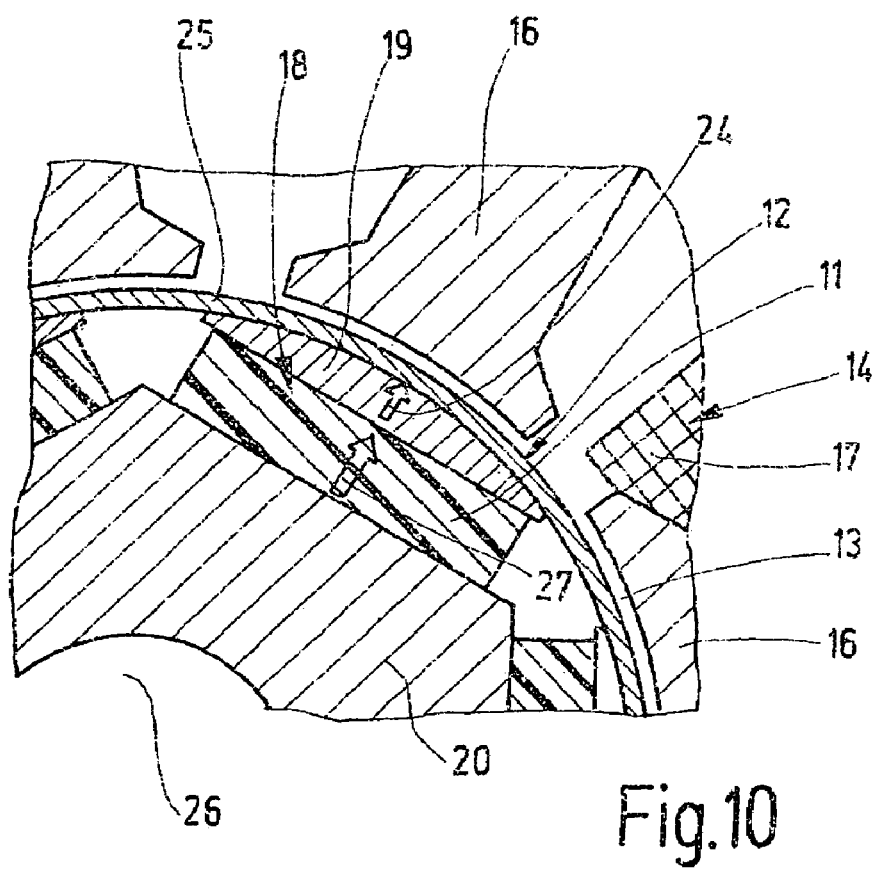

In the modified synchronous motor depicted in the cross sectional detail in FIG. 10, in order to achieve the magnetic anisotropy in the salient poles 18, the pole shoes are made of 2D-anisotropic SMC (soft magnetic composite)-powdered iron material. This material has a preferred direction of the magnetization or magnetic permeability, as indicated by the arrow 24 in FIG. 10. The magnetic properties of the material in this magnetic preferred direction are significantly greater, in this instance approximately four to five times greater than the magnetic properties of this material perpendicular to the preferred direction. For example, the relative permeability of the material in the preferred direction (arrow 24) is approximately 800, while the maximal relative permeability lateral to the preferred direction (perpendicular to arrow 24) is approximately 200. This core-oriented SMC-powdered iron material also achieves a parallel flux course in the pole shoes 19 in the same manner as the provision of flux barriers, which results in the above-described advantageous properties of the motor. The magnetization direction 27 of the permanent magnet 11 is symbolized by the arrow 27 in FIG. 10. The magnetization directions 27 in the two adjacent permanent magnets 11 are inverse to each other.

In the rotor according to FIG. 10 as well, the rotor core 20 is embodied as a polygonal prism and with a six-pole design of the synchronous motor—as shown, is embodied in the form of a hexagonal prism. The likewise block-shaped permanent magnets 11 each rest against one surface of the hexagonal prism and on their sides oriented away from the prism, are each covered by a pole shoe 19. The pole shoes 19 are encompassed by a concentric protective tube 25 made of a material that is magnetically nonconductive or has a low magnetic conductivity, which protects the SMC material of the pole shoes 19 and the rotor 12 as a whole. The rotor core 20 is comprised of solid steel or is instead comprised of a multitude of sheet metal plates stacked against one another, that each have a hexagonal profile with a central, circular opening 26 stamped out from them.

The invention claimed is:

1. An electrical machine, in particular a brushless synchronous motor that has a stator (14) and a rotor (12) with salient poles (18) disposed distributed over its circumference, each of which poles has an enclosed permanent magnet (11) and a pole shoe (19) that extends radially outward from the permanent magnet and defines an air gap (13) between the stator (14) and rotor (12), characterized in that the pole shoes (19) are embodied as magnetically anisotropic, with a preferred direction of the greater magnetic conductivity extending parallel to the radial salient pole axis, wherein in order to achieve the magnetic anisotropy, a multitude of flux barriers (22) that are spaced apart from one another are incorporated into the pole shoes (19), extending parallel to the radial salient pole axis, wherein the flux barriers (22) are comprised of cutouts in the pole shoes (19), wherein the rotor (12) has a polygonal, prismatic rotor core (20), which the permanent magnets (11) rest against, wherein the pole shoes (19) cover the permanent magnets (11) on their sides oriented away from the rotor core (20), abut one another in one piece in the circumference direction, and at these abutting locations, are fastened to the rotor core (20) in one piece by means of narrow radial struts (21), wherein the rotor core (20) with the pole shoes (19) and radial struts (21) is comprised of a multitude of one-piece sheet metal plates stacked against one another, and wherein the cutouts (23) are stamped out in comb-like fashion, with comb openings in the sheet metal plates oriented toward insertion openings for the permanent magnets (11), and wherein a width of the flux barriers (22) is greater than a width b of the permanent magnets (11), and wherein the flux barriers (22) are arranged one after the other and distributed over the whole width b of each of the permanent magnets (11) and also laterally beyond both peripheral ends of each of the permanent magnets (11) as considered in a direction of the width b of each of the permanent magnets (11).

2. The machine according to claim 1, wherein the flux barriers (22) are comprised of inclusions made of magnetically nonconductive material.

3. The machine according to claim 1, wherein the number of cutouts (23) per pole shoe (19) depends on the width of the salient pole and the thickness of the sheet metal plates.

4. The machine according to claim 1, wherein the permanent magnets (11) are embodied as block-shaped and have a magnetization direction extending parallel to the normals on the largest magnet surfaces (111, 112) and that the preferred direction of the greatest magnetic conductivity of the pole shoes (19) coincides with the magnetization direction (27) of the permanent magnets (11).

* * * * *